(12) United States Patent
Orr et al.

(10) Patent No.: US 9,319,351 B1
(45) Date of Patent: Apr. 19, 2016

(54) MECHANISM FOR WIRE-SPEED STATEFUL PACKET INSPECTION IN PACKET PROCESSORS

(71) Applicants: Marvell International Ltd., Hamilton (BM); Marvell Israel (M.I.S.L) Ltd., Yoknaem (IL)

(72) Inventors: Michael Orr, Sunnyvale, CA (US); Gad Hutt, Sunnyvale, CA (US); David Melman, D.N. Bikat Beit Hakerem (IL); Uri Safrai, Sunnyvale, CA (US)

(73) Assignees: Marvell Israel (M.I.S.L.) Ltd., Yokneam (IL); Marvell International Ltd., Hamilton (BM)

( * ) Notice: Subject to any disclaimer, the term of this patent is extended or adjusted under 35 U.S.C. 154(b) by 326 days.

(21) Appl. No.: 14/090,368

(22) Filed: Nov. 26, 2013

Related U.S. Application Data

(60) Provisional application No. 61/729,829, filed on Nov. 26, 2012.

(51) Int. Cl.
*H04L 12/28* (2006.01)
*G06F 15/16* (2006.01)
*H04L 12/931* (2013.01)

(52) U.S. Cl.
CPC .................................... *H04L 49/45* (2013.01)

(58) Field of Classification Search
None
See application file for complete search history.

(56) References Cited

U.S. PATENT DOCUMENTS

| | | | |
|---|---|---|---|
| 6,496,935 B1 * | 12/2002 | Fink et al. | 726/13 |
| 7,424,019 B1 | 9/2008 | Kopelman et al. | |
| 7,626,938 B1 | 12/2009 | Orr et al. | |
| 8,065,721 B1 * | 11/2011 | Shah | 726/13 |
| 8,255,515 B1 | 8/2012 | Melman et al. | |
| 8,339,959 B1 * | 12/2012 | Moisand et al. | 370/235 |
| 2002/0065938 A1 * | 5/2002 | Jungck et al. | 709/246 |
| 2003/0041172 A1 | 2/2003 | Calvignac et al. | |
| 2008/0201772 A1 | 8/2008 | Mondaeev et al. | |
| 2010/0138543 A1 * | 6/2010 | Loman et al. | 709/227 |
| 2011/0116507 A1 | 5/2011 | Pais et al. | |
| 2012/0110656 A1 * | 5/2012 | Santos et al. | 726/13 |
| 2012/0177047 A1 | 7/2012 | Roitshtein | |

OTHER PUBLICATIONS

Trabelsi, Zouheir; Teaching Stateless and Stateful Firewall Packet Filtering: A Hands-on Approach; Jun. 11, 2012; 8 pages.
Dobrescu, Mihai et al; Toward Predictable Performance in Software Packet-Processing Platforms; 2012; 14 pages.
Corner, Douglas; Network Processors: Programmable Technology for Building Network Systems; Dec. 2004; 8 pages.

* cited by examiner

*Primary Examiner* — Steven H Nguyen (57) ABSTRACT

A packet processor includes an extraction circuit, a lookup circuit, an assignment circuit, a rule matching circuit, and an action circuit. The extraction circuit generates a first set of values based on a first packet. The lookup circuit stores metadata values. Each of the metadata values corresponds to a respective metadata identifier. The assignment circuit assigns a first metadata identifier to the first packet. The lookup circuit selectively retrieves a first metadata value that corresponds to the first metadata identifier. The rule matching circuit selects a first rule from among a predetermined set of rules based on the first set of values and the first metadata value. The action circuit identifies a first action specified by the first rule and performs the first action. The first action includes modifying the first metadata value of the plurality of metadata values.

27 Claims, 11 Drawing Sheets

MECHANISM FOR WIRE-SPEED STATEFUL PACKET INSPECTION IN PACKET PROCESSORS

CROSS-REFERENCE TO RELATED APPLICATIONS

This application claims the benefit of U.S. Provisional Application No. 61/729,829, filed on Nov. 26, 2012. The entire disclosure of the application referenced above is incorporated herein by reference.

FIELD

The present disclosure relates to packet processing in a networking device, and more particularly to stateful packet inspection at wire speeds.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A router is a device that forwards packets between computer networks. A router typically includes a processor that can process packets in a stateless manner or in a stateful manner.

Figure 1A:
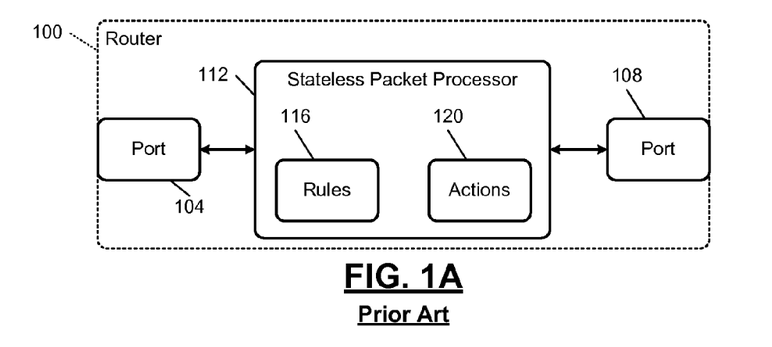
FIG. 1A is a functional block diagram of an example router according to the prior art.

FIG. 1A illustrates a conventional router 100 including a first port 104, a second port 108, and a stateless packet processor 112. Although only two ports 104, 108 are shown in FIG. 1A, the router 100 may include additional ports. The stateless packet processor 112 receives packets from the first port 104 and the second port 108 and transmits packets to the first port 104 and the second port 108. The stateless packet processor 112 applies, to the packets, one or more rules from a set of rules 116. Each of the applicable rules corresponds to a respective action from a set of actions 120. Multiple rules may apply to a single packet and the application of one of the rules to the packet may cause another of the rules to also become applicable to the packet. However, the actions performed on a given packet are not dependent on any previous packets. This is the definition of stateless for the stateless packet processor 112.

Figure 1B:
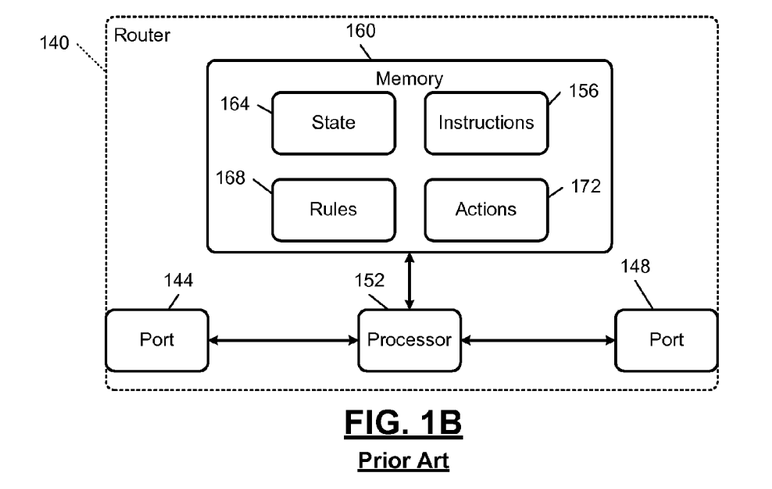
FIG. 1B is another implementation of a router according to the prior art.

FIG. 1B illustrates a conventional router 140 that uses a software-based processing system to save state information and allow for stateful packet inspection. The router 140 includes a first port 144, a second port 148, and a processor 152 that communicates with the first port 144 and the second port 148. The processor 152 executes instructions 156 out of memory 160. The memory 160 also includes state information 164, sets of rules 168, and sets of actions 172.

The state information 164 tracks characteristics of previous packets, such as whether particular types of packets have been seen from or to particular addresses, or how many of a particular type of packet have been seen. Although the processor 152 is able to store the state information 164, the speed of a software system is limited. For example only, at the present time a processor may be capable of inspecting traffic at 4 to 8 Gbps. Meanwhile, network ports of 10 Gbps or 40 Gbps are common in enterprise switches, and a single switch may have a dozen ports or more. A software-based solution is therefore too slow to run at the wire speed (also known as line speed) of 10 Gbps or 40 Gbps per port.

Figure 1C:
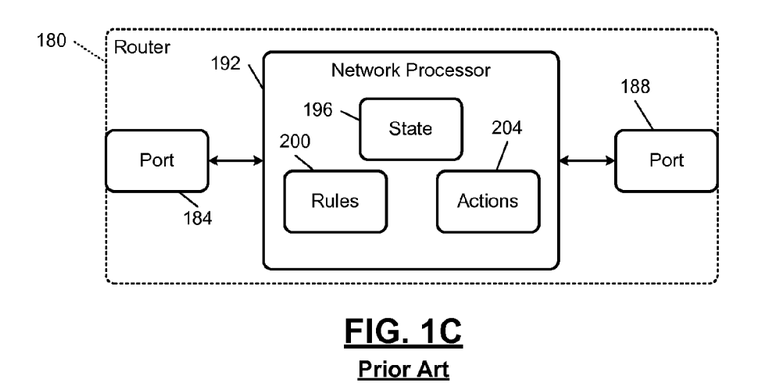
FIG. 1C is yet another implementation of a router according to the prior art.

FIG. 1C illustrates a conventional router 180 that includes a first port 184, a second port 188, and a programmable stateful network processor 192. The network processor 192 includes state information 196, sets of rules 200, and sets of actions 204. Network processors are special-purpose processors with instruction sets tailored to packet processing and specific hardware resources dedicated to packet processing tasks.

Network processors are therefore less flexible than software-based solutions. If a particular packet processing operation was not envisioned by, or implemented by, the designer of the network processor, that processing task may be difficult to implement on the network processor and/or may operate with decreased performance. A network processor must be programmed and the microprogramming required generally requires a very detailed understanding of the hardware components of the network processor and their interaction. Further, network processors are much more expensive than standard packet processors.

SUMMARY

A packet processor includes an extraction circuit, a lookup circuit, an assignment circuit, a rule matching circuit, and an action circuit. The extraction circuit generates a first set of values based on a first packet. The lookup circuit stores metadata values. Each of the metadata values corresponds to a respective metadata identifier. The assignment circuit assigns a first metadata identifier to the first packet. The lookup circuit selectively retrieves a first metadata value that corresponds to the first metadata identifier. The rule matching circuit selects a first rule from among a predetermined set of rules based on the first set of values and the first metadata value. The action circuit identifies a first action specified by the first rule and performs the first action. The first action includes modifying the first metadata value of the plurality of metadata values.

A method of operating a network device includes generating a first set of values based on a first packet. The method further includes storing metadata values. Each metadata value of the metadata values corresponds to a respective metadata identifier of a plurality of unique metadata identifiers. The method further includes assigning a first metadata identifier to the first packet. The method further includes selectively retrieving a first metadata value of the plurality of metadata values that corresponds to the first metadata identifier. The method further includes selecting a first rule from among a predetermined set of rules based on the first set of values and the first metadata value of the plurality of metadata values. The method further includes identifying a first action specified by the first rule of the predetermined set of rules. The method further includes performing the first action. The first action includes modifying the first metadata value of the plurality of metadata values.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 2:
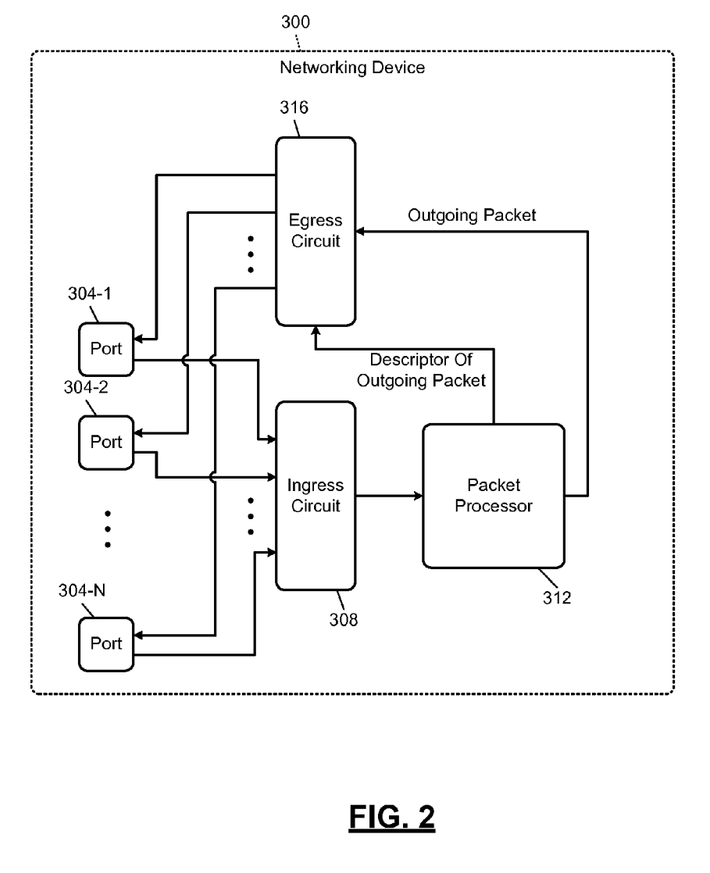
FIG. 2 is a functional block diagram of a networking device according to one implementation of the principles of the present disclosure.

FIG. 2 illustrates a networking device 300 that includes N ports 304-1, 304-2, . . . 304-N (collectively, ports 304). The ports 304 provide incoming packets to an ingress circuit 308, which provides the packets to a packet processor 312. The packet processor 312 processes each packet and, for packets that are not going to be dropped, outputs the packets to an egress circuit 316. The egress circuit 316 outputs packets over a respective one of the ports 304 based on descriptors provided by the packet processor 312. The networking device 300 may include a firewall, an intrusion prevention system, and/or an intrusion detection system.

Figure 3A:
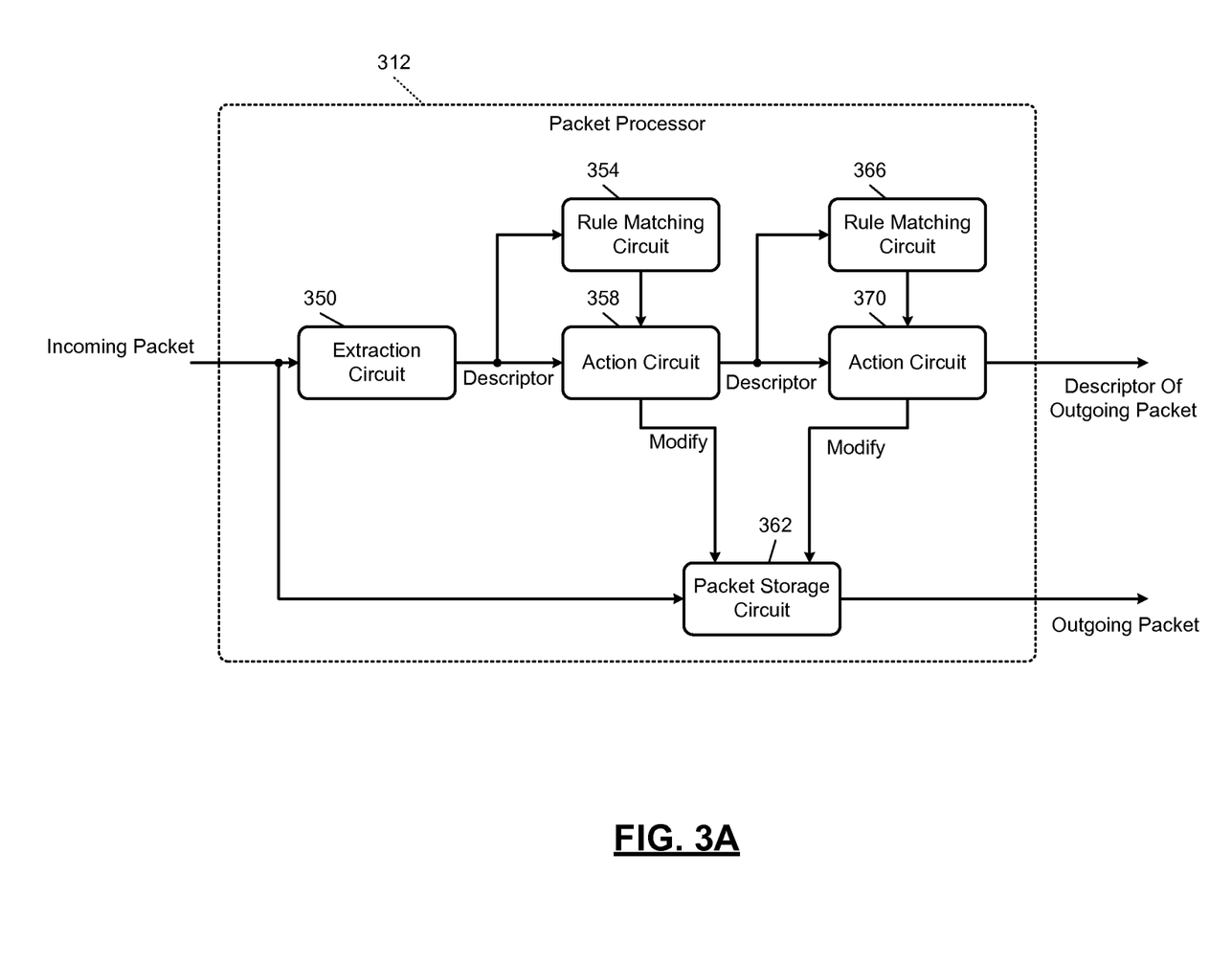
FIGS. 3A-3B are functional block diagrams of example implementations of a packet processor.

FIG. 3 illustrates a first example implementation of the packet processor 312. The packet processor 312 includes an extraction circuit 350 that generates a descriptor based on an incoming packet. The descriptor may include information extracted directly from the packet and/or calculated based on packet fields. For example only, the descriptor may include source and target addresses, quality of service parameters, etc.

The descriptor is provided to a rule matching circuit 354 that selects a rule either exactly matching the descriptor or based on a best match. The rule matching circuit 354 may evaluate a predetermined set of rules in a predefined order and select the first matching rule. Further rules in the predetermined set of rules that would have matched the descriptor are ignored once the match is found. Alternatively, actions corresponding to all matching rules may be performed. Because the actions may be inconsistent, the actions may be performed in reverse order of priority—i.e., the action corresponding to the highest priority rule is performed last, and can therefore partially or fully override actions corresponding to lower priority rules.

The matched rule from the rule matching circuit 354 includes a pointer to a specific action in an action circuit 358. The action circuit 358 performs the action pointed to by the rule matching circuit 354. The incoming packet may be stored in a packet storage circuit 362. The selected action of the action circuit 358 may include modifying part of the packet stored in the packet storage circuit 362. In addition, the action circuit 358 may update the descriptor and output the updated descriptor. The updated descriptor may include bits indicating what should be done with the corresponding packet. For example, a single bit may indicate that the packet should be dropped. Multiple bits of the descriptor may indicate a port from which the packet should be forwarded.

The descriptor (as modified) from the action circuit 358 may be output from the packet processor 312 along with a copy of the packet (as modified). In other implementations, such as is shown in FIG. 3A, additional rule sets may be applied to the packet. The descriptor is therefore provided to a second rule matching circuit 366, which identifies a rule that matches the descriptor and points to an action in a second action circuit 370. The second action circuit 370 performs the selected action, which may include modifying the packet stored in the packet storage circuit 362 and/or the descriptor.

Although shown with two iterations of rule matching, a packet processor according to the present disclosure may implement additional rounds of rule matching. In various implementations, the rule sets used by the rule matching circuit 354 and the second rule matching circuit 366 may be the same. In addition, the sets of actions in the action circuit 358 and the second action circuit 370 may be the same.

Figure 3B:
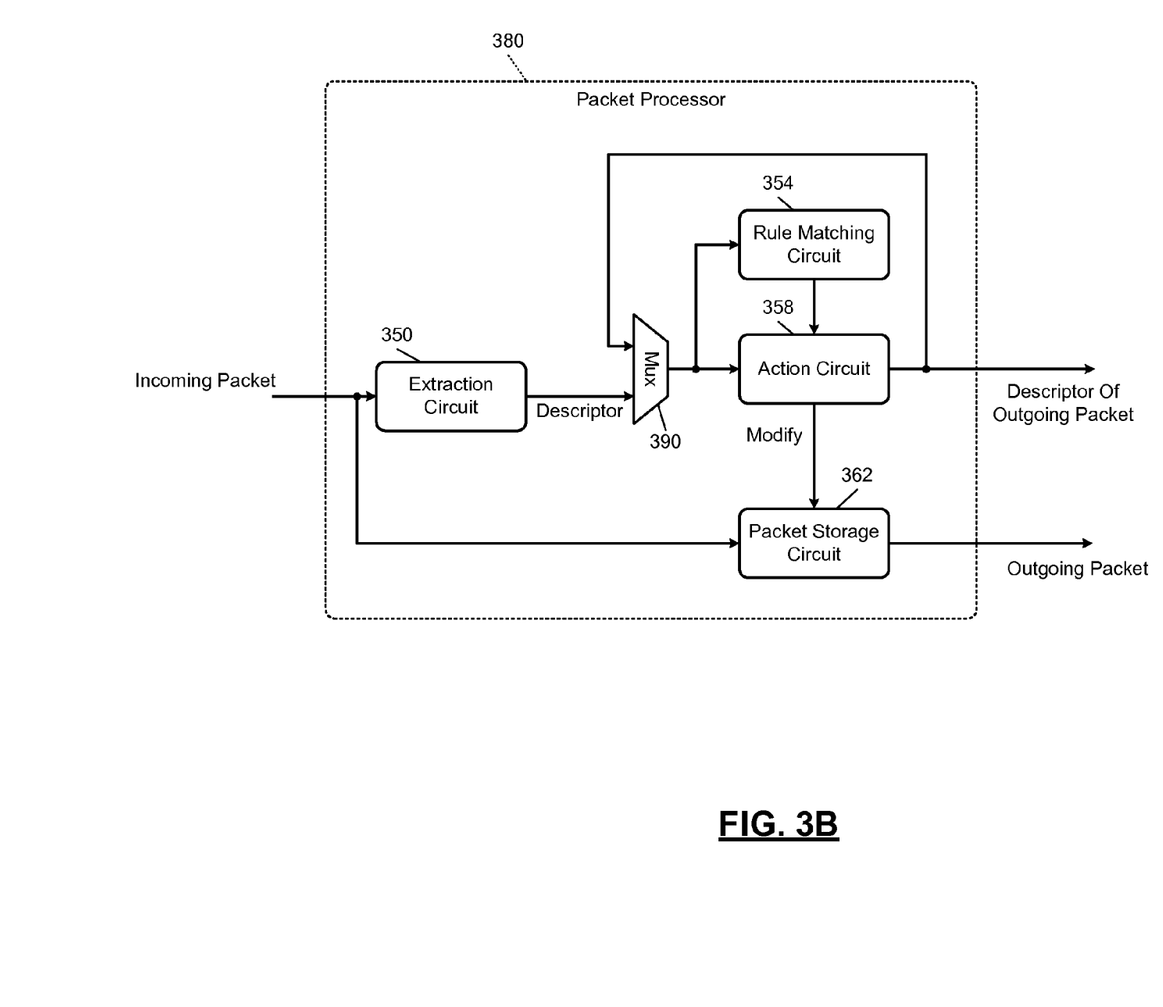

As shown in FIG. 3B, the action circuit 358 and the rule matching circuit 354 of a packet processor 380 may iteratively operate on the packet and the descriptor for multiple rounds. In one implementation, the extraction circuit 350 provides the descriptor to the action circuit 358 via a first input of a multiplexer 390. After performing the designated action, the action circuit 358 can feed the descriptor back to the rule matching circuit 354 via a second input of the multiplexer 390.

Figure 4A:
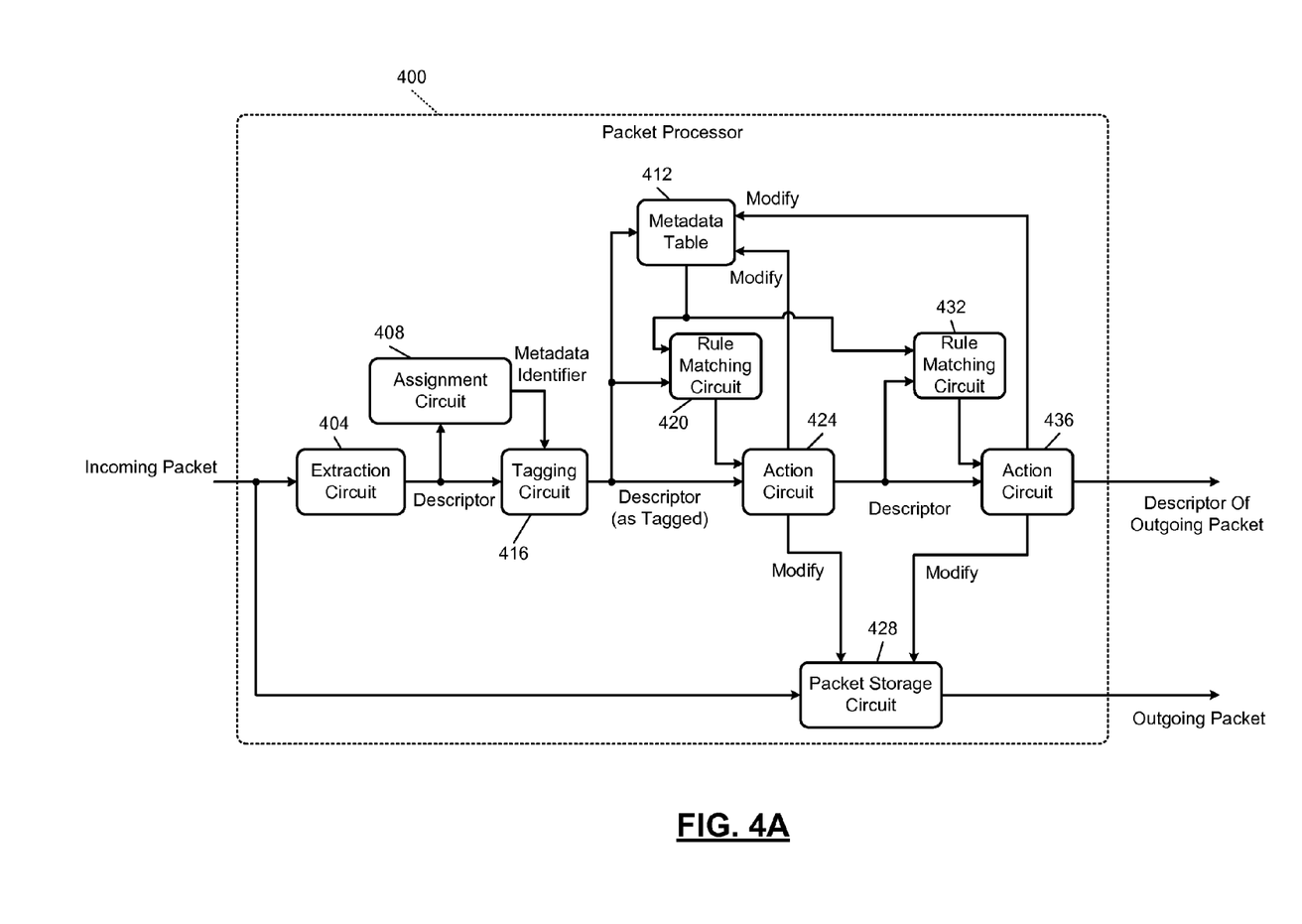
FIGS. 4A-4C are functional block diagrams of additional example implementations of a packet processor.

FIG. 4A illustrates a packet processor 400 according to one implementation. The packet processor 400 keeps track of state information, thereby allowing for stateful packet inspection. The packet processor 400 builds on the disclosure of FIGS. 3A and 3B. In other words, one or more rounds of rule matching may be performed using either or both of the techniques shown in FIGS. 3A and 3B. The additional structures described for storing state information can be implemented in an existing non-programmable packet processor, such as a packet processor in the Marvell® Prestera® family.

In the packet processor 400, an extraction circuit 404 receives an incoming packet and prepares a descriptor. The descriptor is provided to an assignment circuit 408, which determines a metadata identifier corresponding to the descriptor. The metadata identifier is an index into a metadata table 412, also called a lookup circuit. The metadata table 412 stores multiple metadata entries that are persistent across multiple packets. In other words, the metadata may be updated by an action corresponding to one packet and then referenced by a rule corresponding to a future packet.

In various implementations, the metadata table 412 may include 1,024 metadata entries that are each 16 bits in length. The 16 bits can be bit-masked and subdivided for semantics and code-space divisions. For example, one of the bits, such as the most significant bit, can indicate that the metadata entry is to be used only once. In another example, multiple bits may be used as an aging counter to determine when the metadata may be stale and no longer relevant, or for use in determining which metadata to replace with more recent data. A single bit could indicate whether a transmission control protocol (TCP) connection is established. In another example, multiple bits may be used to track the TCP handshake process.

Each entry of the metadata table 412 stores a value and is identified by a corresponding metadata identifier. In various implementations, the metadata entries are numbered sequentially, and the metadata identifier indicates the metadata entry's location within that sequential order. For example only, with 1,024 ($2^{10}$) metadata entries, the metadata entries can be numbered from 0 to 1,023, with the metadata identifier being a 10-bit binary number. In response to receiving a metadata identifier of, for example, 645 (1010000101 in binary), the metadata table 412 returns the value stored in the 646th metadata entry.

In one particular implementation, the assignment circuit 408 may be set up so that incoming packets corresponding to a certain destination address and certain TCP port number are assigned the same metadata identifier. In this way, the metadata corresponding to that metadata identifier may store information relating to that flow of packets, such as whether a TCP connection has been established and/or a measure of throughput for that flow of packets.

A tagging circuit 416 combines the descriptor with the metadata identifier and outputs the tagged descriptor to a rule matching circuit 420 and the metadata table 412. The tagging circuit 416 may simply concatenate the descriptor with the metadata identifier. The metadata identifier portion of the descriptor indexes the metadata table 412, which allows the metadata table 412 to provide corresponding metadata to the rule matching circuit 420. Based on the provided metadata and the descriptor, the rule matching circuit 420 identifies a matching rule.

The matching rule points to a particular action in an action circuit 424. The identified action may modify the descriptor, may modify the incoming packet as stored in a packet storage circuit 428, and/or may modify the associated metadata in the metadata table 412. Similarly to FIG. 3A, the descriptor as updated may be provided to a second rule matching circuit 432, which identifies a matching rule based on the descriptor as well as based on the corresponding metadata from the metadata table 412. The second rule matching circuit 432 selects a corresponding action in a second action circuit 436.

The second action circuit 436 may modify metadata in the metadata table 412, packet data in the packet storage circuit 428, and/or the packet descriptor. The resulting descriptor is output from the packet processor 400, as is the outgoing packet. In the implementation depicted, the egress circuit 316 of FIG. 2 may receive a packet and a descriptor indicating that the packet should be dropped. In other implementations, when the descriptor of an outgoing packet indicates the packet should be dropped, the descriptor and the outgoing packet may simply not be forwarded to the egress circuit 316.

Although FIG. 4A shows a single metadata table, a metadata table may be implemented in the packet processor 400 for each set of rules. See, for example, FIG. 4B, where an example packet processor 440 includes a second metadata table 450 configured to provide metadata to the second rule matching circuit 432 based on the metadata identifier embedded in the descriptor. A metadata table may be dedicated to each networking port, to each packet queue, and/or to each virtual local area network (VLAN). A metadata table may also be dedicated to storing counters, which may be used to track packets in particular flows for rate limiting and/or quality of service control. When rule matching and action performance is pipelined, a metadata table may be implemented for each pipeline stage.

Figure 4B:
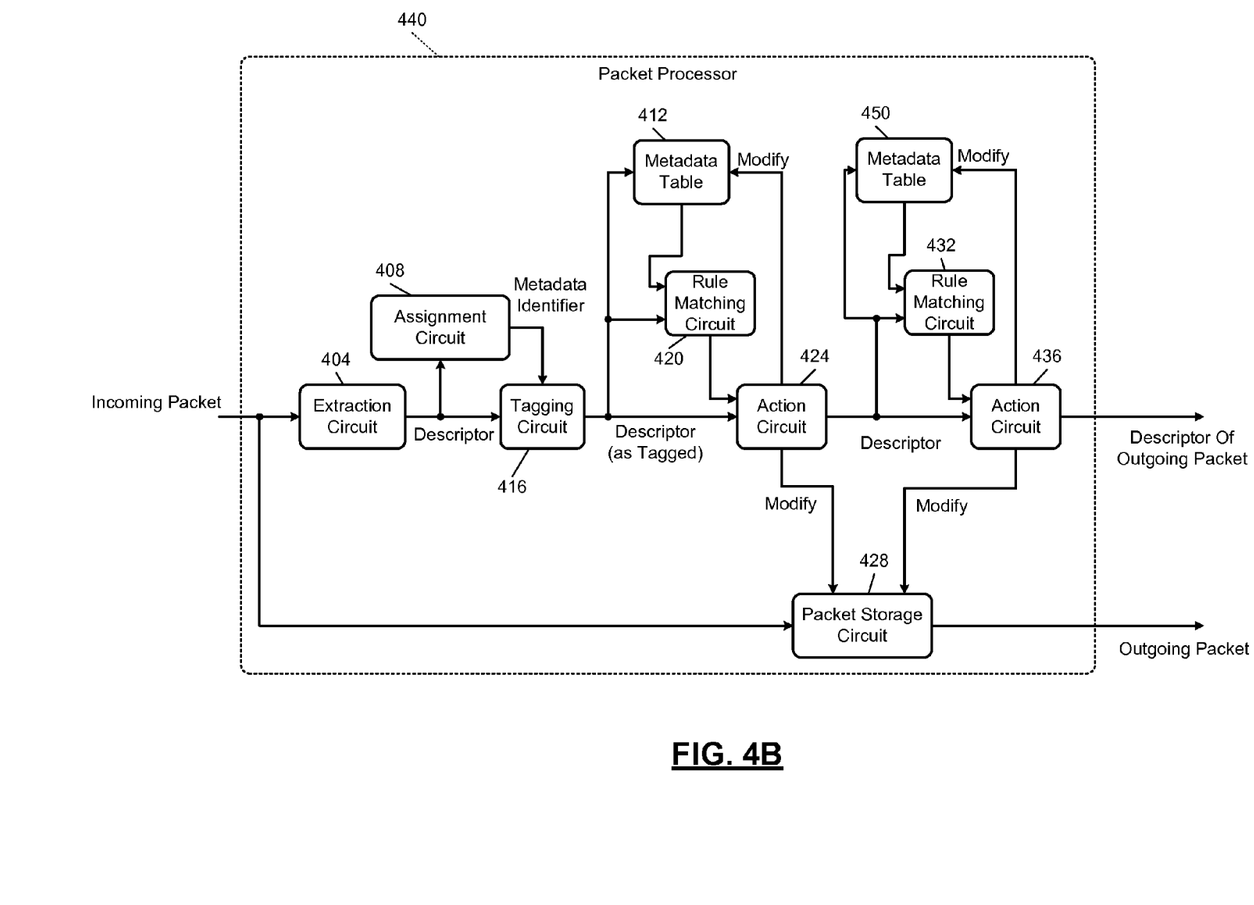

Different metadata tables may also be assigned per individual rule. For example, a rule matching circuit may evaluate a set of rules in a predefined order. When evaluating the first rule to determine a match, the rule matching circuit may use metadata values from a first metadata table, and when evaluating the second rule to determine a match, the rule matching circuit may use metadata values from a second metadata table, etc. In various implementations, the first rule to match is selected, meaning that rules earlier in the predefined order have a higher priority.

For each round of rule matching, the metadata identifier for the packet may be changed. For example, the assignment circuit 408 may assign a metadata identifier to the packet for a first round based on a TCP port number of the packet. For a second round of rule matching, a different metadata identifier based on source address may be assigned to the packet.

Figure 4C:
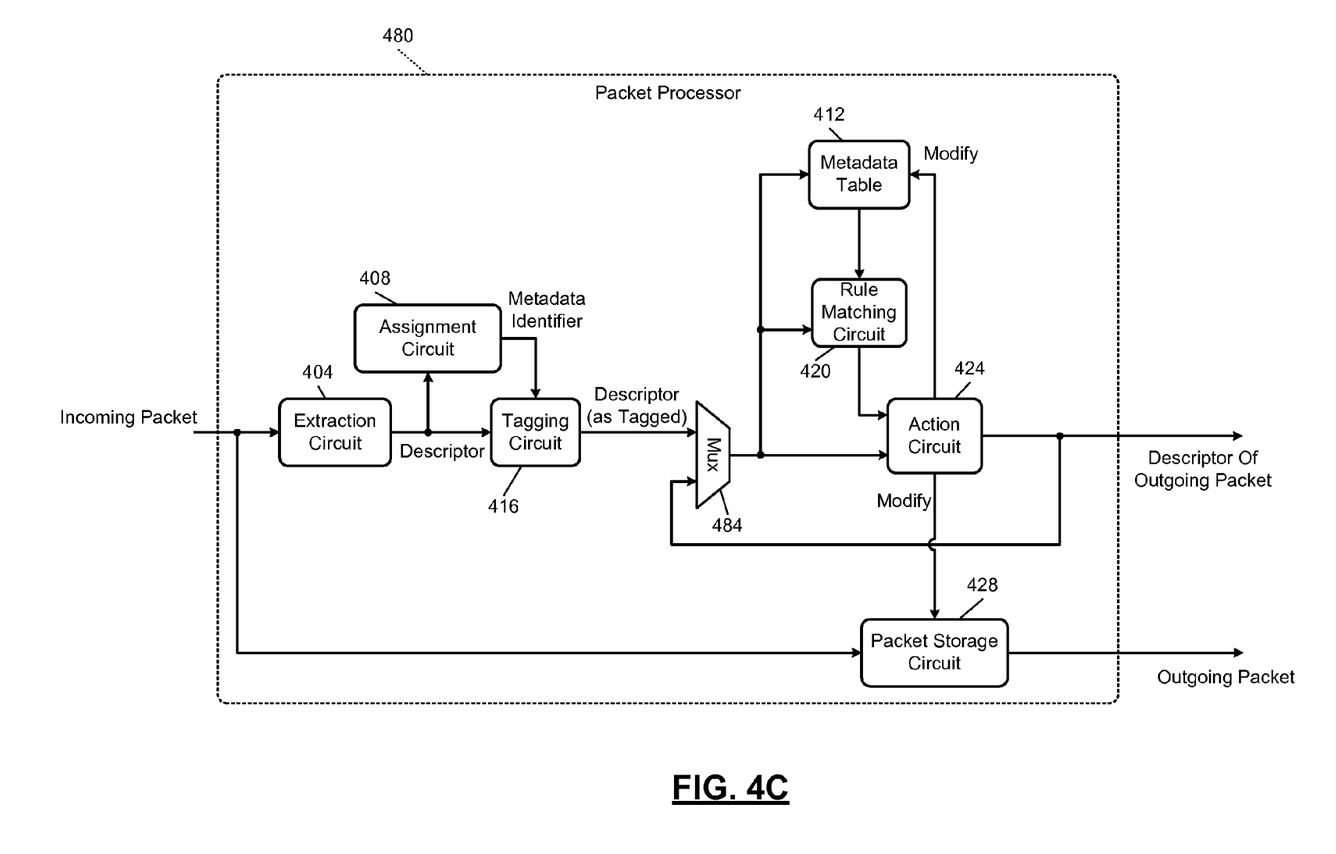

FIG. 4C shows an example packet processor 480 in an iterative configuration, where the action circuit 424 and the rule matching circuit 420 perform one or more rounds of rule matching and actions on a packet. A multiplexer 484, which may operate similarly to the multiplexer 390 of FIG. 3B, allows the descriptor to be fed back to the metadata table 412, the rule matching circuit 420, and the action circuit 424 for additional rounds of processing.

Figure 5A:
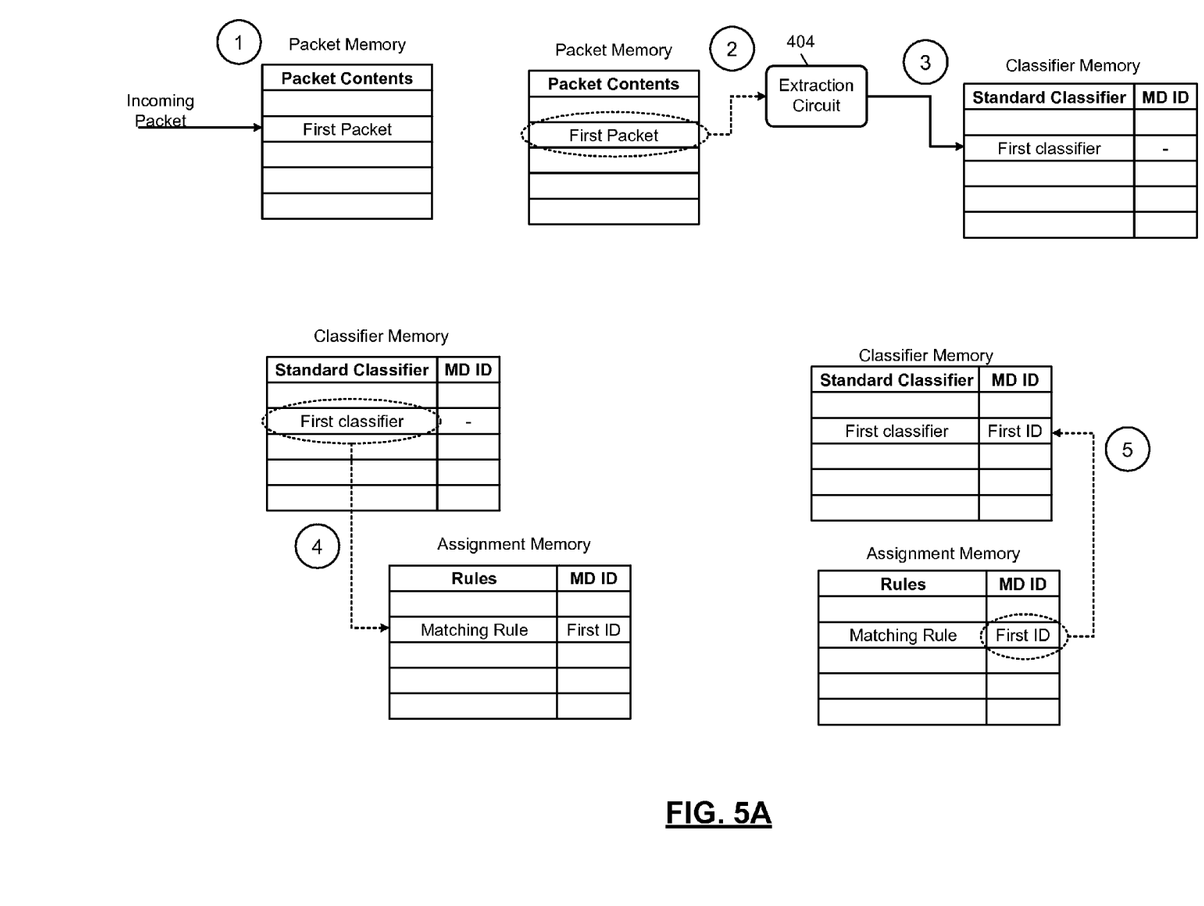
FIGS. 5A-5C graphically depict elements of the packet processor of FIGS. 4A-4C and illustrate example data flow.

In FIG. 5A, an incoming packet (referred to as the "first packet") is stored into a packet memory in phase 1, depicted with a numeral 1 in a circle. In phase 2, the first packet is provided to the extraction circuit 404, which generates a first classifier. The first classifier is stored in a corresponding section of classifier memory in phase 3. The classifier memory also includes a field for a metadata ID, but the metadata ID field is not immediately known. In phase 4 the stored first classifier is provided to assignment memory, which has a set of rules and corresponding metadata IDs. The first classifier is used to match against the set of rules in the assignment memory, and the metadata ID corresponding to the matched rule (referred to as the first ID) is provided to the classifier memory for storage with the first classifier in phase 5.

Figure 5B:
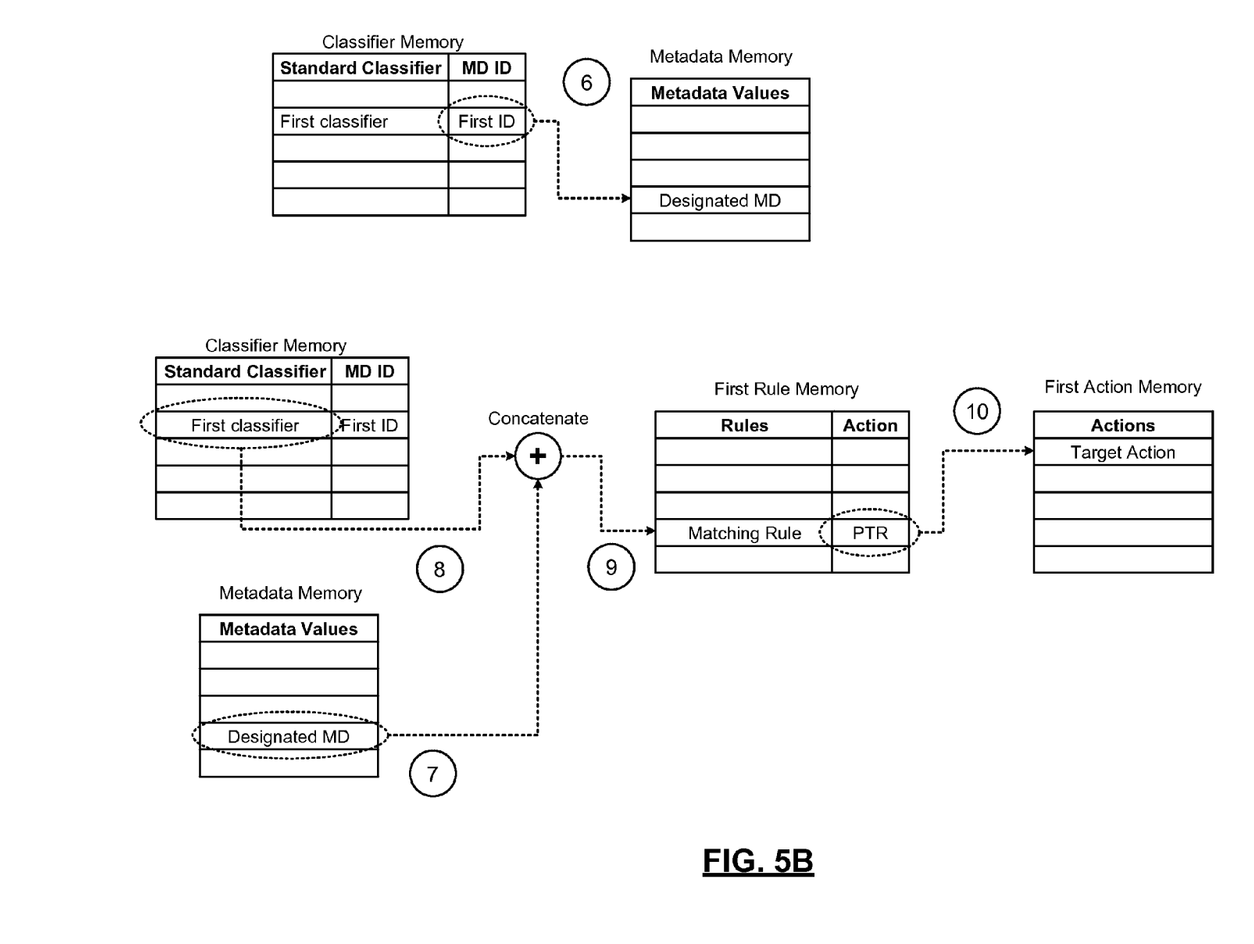

In FIG. 5B, the first ID is used to index into metadata memory in phase 6. In phase 7 the designated metadata is output from the metadata memory, and in phase 8 the first classifier from the classifier memory is output. The designated metadata and the first classifier are combined, such as by using concatenation, and the resulting combination is used in phase 9 to identify a matching rule in first rule memory. In phase 10, a pointer stored by the matching rule identifies an action in a first action memory.

Figure 5C:
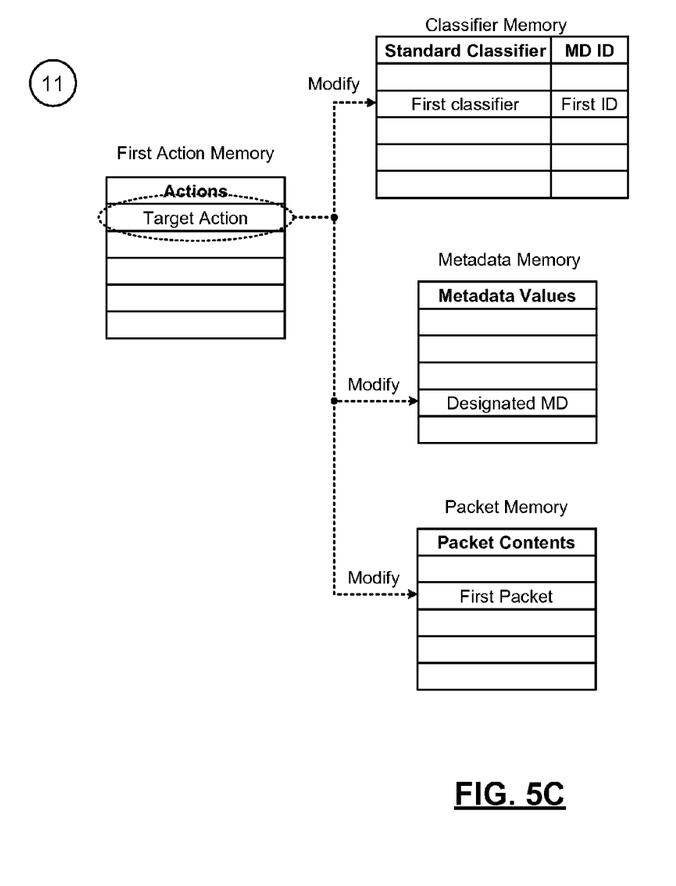

In FIG. 5C, phase 11 includes performing the target action from the first action memory. The selected action may include modifying the first classifier, modifying the designated metadata, and/or modifying the first packet. Phases 7 through 11 may be repeated on the packet, with the same or differing rule memory and with the same or differing action memory.

The packet processor 400 may allow significant stateful packet inspection functionality without requiring network processors or the less-than-wire-speed performance of a software implementation. To allow for fast lookups, the rule tables and assignment tables described above may be implemented as content-addressable memories, or more particularly as ternary content addressable memories. Ternary content addressable memories allow for matches where certain bits that are not of interest are ignored.

Figure 6:
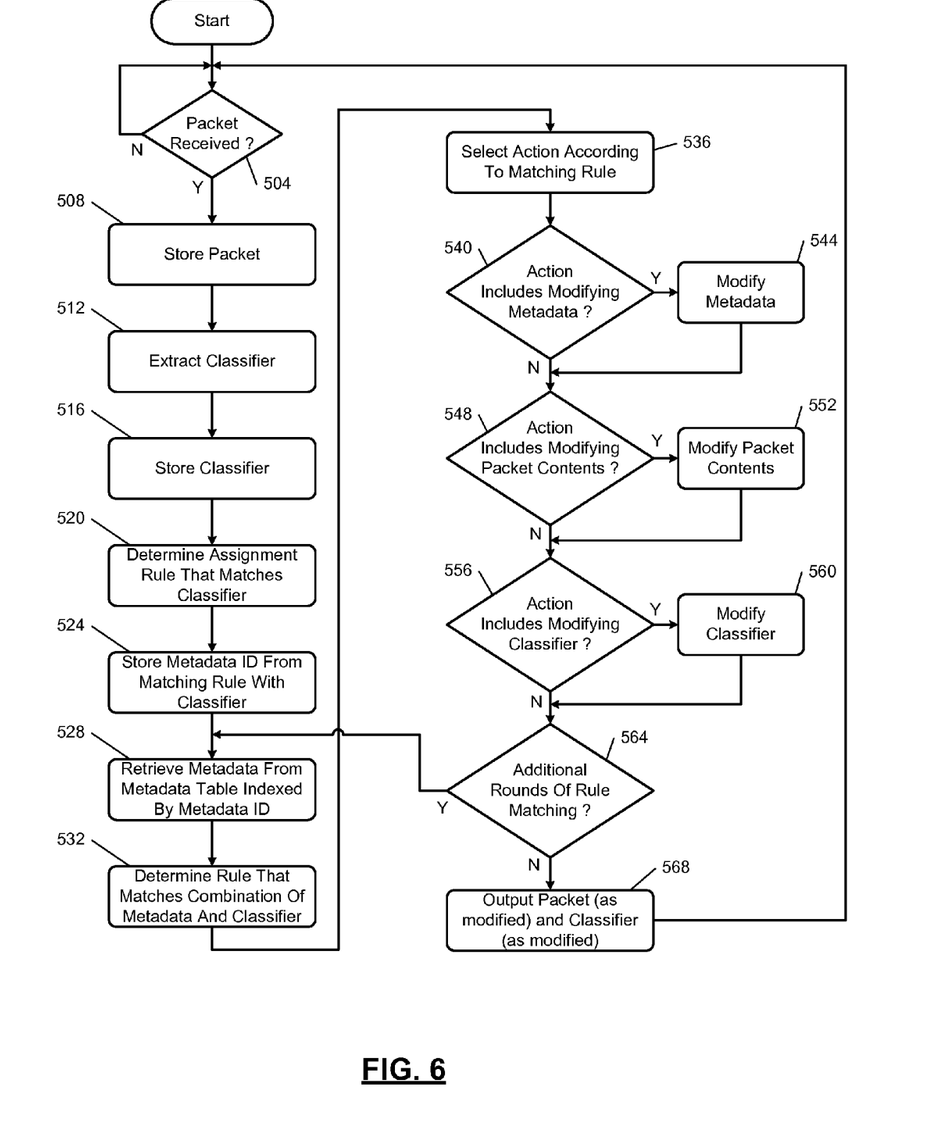
FIG. 6 is a flowchart showing example operation of a packet processor according to one implementation of the principles of the present disclosure.

In FIG. 6, example packet processor operation begins at 504. If a packet is received at 504, control continues at 508; otherwise, control remains at 504. At 508 the packet is stored, and at 512 a classifier for the packet is extracted. The classifier is stored at 516, and at 520 a metadata assignment rule is selected that best matches the classifier. At 524, the metadata ID corresponding to the matching assignment rule is stored along with the classifier. At 528, a metadata table is indexed by the metadata ID and the corresponding metadata is retrieved.

At 532, control determines a rule from a set of rules that best matches the combination of the retrieved metadata and the classifier. At 536, control selects the action pointed to by the rule matched at 532. Control continues at 540, where if the action includes modifying metadata, control transfers to 544, where metadata is modified. Otherwise, control transfers to 548, where if the action includes modifying packet contents, control transfers to 552, where packet contents are modified. Otherwise, control transfers to 566, where if the action includes modifying the classifier, control transfers to 560, where the classifier is modified.

At 564, if additional rounds of rule matching are to be performed, control returns to 528; otherwise, control transfers to 568. At 568, the packet (which may have been modified at 552) is output. In addition, the corresponding classifier (which may have been modified at 560) is also output. Control then returns to 504. Although the control from 528 through 564 is shown as a loop, in various implementations the rule sets, action sets, and even metadata tables used may differ from one round to the next.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

The term circuit may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); other suitable hardware components that provide the described functionality; or a combination of some or all of the above, such as in a system-on-chip.

What is claimed is:

1. A packet processor comprising:
   an extraction circuit configured to generate a first set of values based on a first packet;
   a lookup circuit configured to store a plurality of metadata values, wherein each metadata value of the plurality of metadata values corresponds to a respective metadata identifier of a plurality of unique metadata identifiers;
   an assignment circuit configured to assign a first metadata identifier to the first packet, wherein the lookup circuit is configured to selectively retrieve a first metadata value of the plurality of metadata values that corresponds to the first metadata identifier;
   a rule matching circuit configured to select a first rule from among a predetermined set of rules based on (i) the first set of values and (ii) the first metadata value of the plurality of metadata values; and
   an action circuit configured to (i) identify a first action specified by the first rule of the predetermined set of rules and (ii) perform the first action, wherein the first action includes modifying the first metadata value of the plurality of metadata values.

2. The packet processor of claim 1, wherein the first action includes modifying the first set of values.

3. The packet processor of claim 1, wherein the first action includes modifying the first packet.

4. The packet processor of claim 1, wherein each metadata value of the plurality of metadata values comprises a bit field.

5. The packet processor of claim 4, wherein, for each metadata value of the plurality of metadata values, a first bit of the bit field specifies whether information from the bit field is to be used only once.

6. The packet processor of claim 4, wherein, for each metadata value of the plurality of metadata values, a first plurality of bits of the bit field indicates an age of information in the bit field.

7. The packet processor of claim 1, further comprising a second lookup circuit configured to store a second plurality of metadata values, wherein:
   each metadata value of the second plurality of metadata values corresponds to a respective metadata identifier of a second plurality of unique metadata identifiers,
   the rule matching circuit is configured to use information from the lookup circuit to evaluate the first rule of the predetermined set of rules, and
   the rule matching circuit is configured to use information from the second lookup circuit to evaluate a second rule of the predetermined set of rules.

8. The packet processor of claim 1, wherein:
   the rule matching circuit is configured to select the first rule from among the predetermined set of rules based on (i) the first set of values and (ii) a value of a first counter, and
   the first metadata value of the plurality of metadata values stores the value of the first counter.

9. The packet processor of claim 8, further comprising a second lookup circuit configured to store a second plurality of metadata values, wherein each metadata value of the second plurality of metadata values corresponds to a respective metadata identifier of a second plurality of unique metadata identifiers, and wherein one of the second plurality of metadata values stores a value of a second counter.

10. The packet processor of claim 1, further comprising:
    a second lookup circuit configured to store a second plurality of metadata values, wherein each metadata value of the second plurality of metadata values corresponds to a respective metadata identifier of a second plurality of unique metadata identifiers, wherein the second lookup circuit is configured to selectively retrieve a second metadata value of the second plurality of metadata values that corresponds to the first metadata identifier;
    a second rule matching circuit configured to select a second rule from among a second predetermined set of rules based on (i) the first set of values and (ii) the second metadata value of the second plurality of metadata values; and
    a second action circuit configured to (i) select a second action specified by the second rule of the second predetermined set of rules, and (ii) perform the second action, wherein the second action includes modifying the selected one of the plurality of metadata values.

11. The packet processor of claim 10, wherein the second predetermined set of rules is a duplicate of the predetermined set of rules.

12. A networking device comprising:
    the packet processor of claim 1; and
    a plurality of network ports.

13. The networking device of claim 12, wherein the plurality of network ports each have a respective line speed, and wherein the packet processor is configured to process packets from the plurality of network ports at the respective line speeds of the plurality of network ports.

14. The networking device of claim 12, wherein the networking device comprises a firewall.

15. The networking device of claim 12, wherein the networking device comprises at least one of an intrusion prevention system or an intrusion detection system.

16. A method of operating a network device, the method comprising:
    generating a first set of values based on a first packet;
    storing a plurality of metadata values, wherein each metadata value of the plurality of metadata values corresponds to a respective metadata identifier of a plurality of unique metadata identifiers;
    assigning a first metadata identifier to the first packet;

selectively retrieving a first metadata value of the plurality of metadata values that corresponds to the first metadata identifier;

selecting a first rule from among a predetermined set of rules based on (i) the first set of values and (ii) the first metadata value of the plurality of metadata values;

identifying a first action specified by the first rule of the predetermined set of rules; and performing the first action, wherein the first action includes modifying the first metadata value of the plurality of metadata values.

17. The method of claim 16, wherein the first action includes modifying the first set of values.

18. The method of claim 16, wherein the first action includes modifying the first packet.

19. The method of claim 16, wherein each metadata value of the plurality of metadata values comprises a bit field.

20. The method of claim 19, wherein, for each metadata value of the plurality of metadata values, a first bit of the bit field specifies whether information from the bit field is to be used only once.

21. The method of claim 19, wherein, for each metadata value of the plurality of metadata values, a first plurality of bits of the bit field indicates an age of information in the bit field.

22. The method of claim 16, further comprising:

storing a second plurality of metadata values, wherein each metadata value of the second plurality of metadata values corresponds to a respective metadata identifier of a second plurality of unique metadata identifiers;

using information from the plurality of metadata values to evaluate the first rule of the predetermined set of rules; and using information from the second plurality of metadata values to evaluate a second rule of the predetermined set of rules.

23. The method of claim 16, wherein the selecting the first rule from among the predetermined set of rules is performed based on (i) the first set of values and (ii) a value of a first counter, wherein the first metadata value of the plurality of metadata values stores the value of the first counter.

24. The method of claim 23, further comprising storing a second plurality of metadata values, wherein each metadata value of the second plurality of metadata values corresponds to a respective metadata identifier of a second plurality of unique metadata identifiers, and wherein one of the second plurality of metadata values stores a value of a second counter.

25. The method of claim 16, further comprising:

storing a second plurality of metadata values, wherein each metadata value of the second plurality of metadata values corresponds to a respective metadata identifier of a second plurality of unique metadata identifiers;

selectively retrieving a second metadata value of the second plurality of metadata values that corresponds to the first metadata identifier;

selecting a second rule from among a second predetermined set of rules based on (i) the first set of values and (ii) the second metadata value of the second plurality of metadata values;

selecting a second action specified by the second rule of the second predetermined set of rules; and performing the second action, wherein the second action includes modifying the selected one of the plurality of metadata values.

26. The method of claim 25, wherein the second predetermined set of rules is a duplicate of the predetermined set of rules.

27. The method of claim 16, wherein the networking device includes a plurality of network ports, wherein the plurality of network ports each have a respective line speed, and wherein the method includes processing packets from the plurality of network ports at the respective line speeds of the plurality of network ports.

* * * * *